United States Patent
Yanagi

(10) Patent No.: US 8,917,335 B2
(45) Date of Patent: Dec. 23, 2014

(54) IMAGE CAPTURING APPARATUS WITH ZOOM FUNCTION

(75) Inventor: Kazunori Yanagi, Akishima (JP)

(73) Assignee: Casio Computer Co., Ltd., Tokyo (JP)

(*) Notice: Subject to any disclaimer, the term of this patent is extended or adjusted under 35 U.S.C. 154(b) by 404 days.

(21) Appl. No.: 13/405,622

(22) Filed: Feb. 27, 2012

(65) Prior Publication Data
US 2012/0154635 A1 Jun. 21, 2012

Related U.S. Application Data

(62) Division of application No. 12/543,018, filed on Aug. 18, 2009, now Pat. No. 8,154,646, which is a division of application No. 11/638,716, filed on Dec. 14, 2006, now Pat. No. 7,711,258.

(30) Foreign Application Priority Data
Dec. 19, 2005 (JP) ................................ 2005-364256

(51) Int. Cl.
H04N 5/232 (2006.01)
G03B 17/04 (2006.01)
H04N 1/00 (2006.01)
H04N 1/21 (2006.01)
H04N 101/00 (2006.01)

(52) U.S. Cl.
CPC .............. *G03B 17/04* (2013.01); *H04N 1/0044* (2013.01); *H04N 1/2125* (2013.01); *H04N 1/2166* (2013.01); *H04N 5/23293* (2013.01); H04N 2101/00 (2013.01)
USPC ................................ 348/240.99; 348/333.12

(58) Field of Classification Search
CPC .................................................. H04N 5/23293
USPC ............... 348/333.01–333.12, 240.99–240.3, 348/207.99
See application file for complete search history.

(56) References Cited

U.S. PATENT DOCUMENTS

| 7,061,528 B1 | 6/2006 | Honma |
| 7,298,409 B1 | 11/2007 | Misawa |
| 7,321,391 B2 | 1/2008 | Ishige |
| 7,595,826 B2 | 9/2009 | Aoki et al. |

(Continued)

FOREIGN PATENT DOCUMENTS

| JP | 2002-152558 A | 5/2002 |
| JP | 2003-078801 A | 3/2003 |
| JP | 2004-200950 A | 7/2004 |
| JP | 2005-269285 | 9/2005 |
| TW | 229549 I | 3/2005 |

OTHER PUBLICATIONS

Related U.S. Appl. No. 11/644,684; filed: Dec. 21, 2006; Kazunori Yanagi'; "Image Capturing Apparatus With Through Image Display Function".

(Continued)

*Primary Examiner* — Tuan Ho
(74) *Attorney, Agent, or Firm* — Holtz, Holtz, Goodman & Chick PC

(57) ABSTRACT

An image capturing apparatus comprises an image capturing unit which captures image data of an object, a zoom image data generating unit which generates items of zoom image data having different zoom magnifications, a display control unit which displays through images on a display unit based on the items of the generated zoom image data, a selection unit which selects one of the zoom magnifications by selecting one of the through images displayed on the display unit, and a recording control unit which records image data corresponding to the selected zoom magnification in a storing medium.

4 Claims, 7 Drawing Sheets

(56) References Cited

U.S. PATENT DOCUMENTS

| | | |
|---|---|---|
| 2003/0160886 A1 | 8/2003 | Misawa et al. |
| 2004/0218080 A1 | 11/2004 | Stavely et al. |
| 2005/0046730 A1 | 3/2005 | Li |
| 2005/0219390 A1 | 10/2005 | Tajima et al. |
| 2006/0050151 A1 | 3/2006 | Fujinawa |
| 2007/0046804 A1 | 3/2007 | Hirano et al. |
| 2007/0146528 A1 | 6/2007 | Yanagi |
| 2007/0291154 A1 | 12/2007 | Moon et al. |
| 2009/0027540 A1 | 1/2009 | Gruhlke |
| 2010/0073544 A1 | 3/2010 | Naruto et al. |

OTHER PUBLICATIONS

Machine Translation of JP 2004-200950: Specification, drawings, and claims.

Taiwanese Office Action dated Oct. 23, 2009 (and English translation thereof) issued in Taiwanese Application No. 095147395, which is a Taiwanese counterpart of parent U.S. Appl. No. 12/543,018.

Japanese Office Action dated Mar. 22, 2011 (and English translation thereof) issued in Japanese Application No. 2005-364256, which is a Japanese counterpart of parent U.S. Appl. No. 12/543,018.

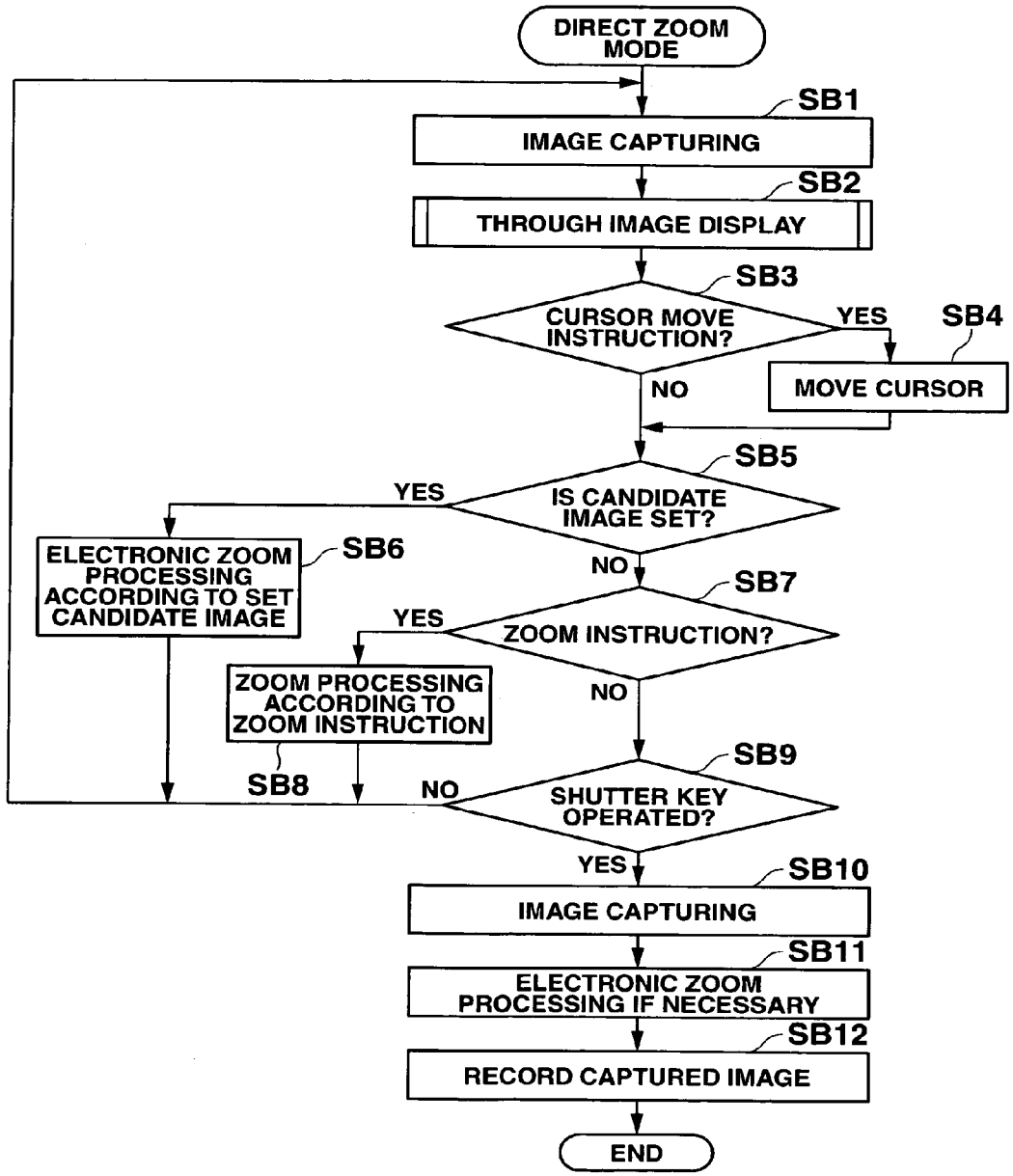

IMAGE CAPTURING APPARATUS WITH ZOOM FUNCTION

CROSS-REFERENCE TO RELATED APPLICATIONS

The present application is a Divisional Application of U.S. application Ser. No. 12/543,018, filed Aug. 18, 2009 now U.S. Pat. No. 8,154,616 which is a Divisional Application of U.S. application Ser. No. 11/638,716, filed Dec. 14, 2006 and issued as U.S. Pat. No. 7,711,258, which is further based upon and claims the benefit of priority from prior Japanese Patent Application No. 2005-364256, filed Dec. 19, 2005, the entire contents of all of which are incorporated herein by reference.

BACKGROUND OF THE INVENTION

1. Field of the Invention

The present invention relates to an image capturing apparatus and an image capturing method applicable to digital cameras having zoom function.

2. Description of the Related Art

A Digital camera is one of the image capturing apparatuses. Conventionally, the digital camera sequentially captures images of an object by an image sensor such as a CCD, and displays the captured images on a monitor thereof as through-the-lens images (hereinafter termed "through images"), on standby for shooting.

As a technique of image display, the following multiple image display is realized. That is, the image sensor captures an image of an object, a plurality of images whose angles of view are respectively different are generated from the captured image by an electronic zoom processing for a plurality of zoom magnifications, and the generated images are multi-displayed (simultaneous displayed) on a monitor as through images (see Jpn. Pat. Appln. Publication No. 2004-200950).

However, the technique described in Jpn. Pat. Appln. Publication No. 2004-200950 is not satisfactorily convenient and still has a room for improvement.

BRIEF SUMMARY OF THE INVENTION

An object of the present invention is to provide an improved image capturing apparatus which displays images of different zoom magnifications on a monitor as through images.

Another object of the present invention is to provide an improved image capturing method which displays images of different zoom magnifications on a monitor as through images.

According to one embodiment of the invention, an image capturing apparatus comprises:

an image capturing unit which captures image data of an object;

a zoom image data generating unit which generates items of zoom image data having different zoom magnifications from the captured image data;

a display control unit which displays through images on a display unit based on the items of the generated zoom image data;

a selection unit which selects one of the zoom magnifications by selecting one of the through images displayed on the display unit; and a recording control unit which records image data corresponding to the selected zoom magnification in a storing medium.

According to another embodiment of the invention, an image capturing apparatus comprises:

an image capturing unit which captures image data of an object;

a zoom image data generating unit which generates items of zoom image data having different zoom magnifications from the captured image data;

a display control unit which displays through images on a display unit based on the items of the generated zoom image data;

a selection unit which selects zoom magnifications by selecting some of the through images displayed on the display unit;

an instruction unit which instructs to execute image capturing; and a recording control unit which records image data corresponding to the selected zoom magnifications to a storing medium when the instruction unit instructs to execute image capturing.

According to another embodiment of the invention, an image capturing apparatus comprises:

an image capturing unit which captures image data of an object;

a zoom image data generating unit which generates items of zoom image data having different zoom magnifications from the captured image data;

a first display control unit which displays through images on a display unit based on the items of the generated zoon image data;

a selection unit which selects zoom magnifications by selecting some of the through images displayed on the display unit;

an optical zoom unit;

an electronic zoom unit; and a second display control unit displays on the display unit a through image corresponding to a zoom magnification realized by the optical zoom unit and a through image corresponding to a zoom magnification realized by both the optical zoom unit and the electronic zoom unit in a different manner.

According to another embodiment of the invention, an image capturing apparatus comprises:

an image capturing unit which captures image data of an object;

a magnification setting unit which sets a zoom magnification;

a zoom image data generating unit which generates first item of image data and second items of image data from the captured image, wherein the first item of image data corresponds to the set zoom magnification, and the second items of image data correspond to different zoom magnifications;

a display control unit displays on a display unit a through image based on the first item of the image data on a first area, and displays a plurality of through images based on the second items of the image data on second areas, wherein a display screen of the display unit being divided into the first area and the second areas which are smaller than the first area;

an instruction unit which instructs to execute image capturing;

a recording control unit which records image data corresponding to the set zoom magnification to a storing medium when the instruction unit instructs to execute image capturing; and a selection unit which selects a zoom magnification by selecting one of the through images displayed on the second areas, wherein the magnification setting unit sets the zoom magnification selected by the selection unit.

According to another embodiment of the invention, an image capturing method for an image capturing apparatus including an image capturing unit which captures image data of an object, a display control unit which displays an image on a display unit based on the image data, and a recording control unit which records the image data in a storing medium, the method comprises:

generating items of zoom image data having different zoom magnifications from the image data output from the image capturing unit;

displaying through images based on the items of the generated zoom image data on the display unit;

selecting one of the zoom magnifications by selecting one of the through images displayed on the display unit; and recording image data corresponding to the selected zoom magnification in the storing medium.

According to another embodiment of the invention, an image capturing method for an image capturing apparatus including an image capturing unit which captures image data of an object, a display control unit which displays an image on a display unit based on the image data, and a recording control unit which records the image data in a storing medium, the method comprises:

generating items of zoom image data having different zoom magnifications from the captured image data;

displaying through images based on the items of the generated zoom image data on the display unit;

selecting zoom magnifications by selecting some of the through images displayed on the display unit; and recording image data corresponding to the selected zoom magnifications in the storing medium when an image capture is instructed.

According to another embodiment of the invention, an image capturing method for an image capturing apparatus including an image capturing unit which captures image data of an object, a display control unit which displays an image on a display unit based on the image data, an optical zoom unit, and an electronic zoom unit, the method comprises:

generating items of zoom image data having different zoom magnifications from the captured image data;

displaying through images on the display unit based on the items of the generated zoon image data;

selecting one of the zoom magnifications by selecting some of the through images displayed by the display control unit; and displaying a through image corresponding to a zoom magnification realized by the optical zoom unit and a through image corresponding to a zoom magnification realized by both the optical zoom unit and the electronic zoom unit in a different manner.

According to another embodiment of the invention, an image capturing method for an image capturing apparatus including an image capturing unit which captures image data of an object, a display control unit which displays an image on a display unit based on the image data, a magnification setting unit which sets a zoom magnification, and a recording control unit which records image data corresponding to the set zoom magnification in a storing medium when an image capture is instructed, the method comprises:

generating first item of image data and second items of image data from the captured image, wherein the first item of image data corresponds to the set zoom magnification, and the second items of image data correspond to different zoom magnifications;

displaying a through image based on the first item of the image data on a first area, and displaying a plurality of through images based on the second items of the image data on second areas, wherein a display screen of the display unit being divided into the first area and the second areas which are smaller than the first area;

selecting a zoom magnification by selecting one of the through images displayed on the second areas; and setting the selected zoom magnification to the magnification setting unit.

According to another embodiment of the invention, a computer program product for use with an image capturing apparatus including an image capturing unit which captures image data of an object, a display control unit which displays an image on a display unit based on the image data, and a recording control unit which records the image data in a storing medium, the computer program product being stored in a computer usable medium including computer readable program means, the computer program product comprises:

first computer readable program means for generating items of zoom image data having different zoom magnifications from the image data output from the image capturing unit;

second computer readable program means for displaying through images based on the items of the generated zoom image data on the display unit;

third computer readable program means for selecting one of the zoom magnifications by selecting one of the through images displayed on the display unit; and fourth computer readable program means for recording image data corresponding to the selected zoom magnification in the storing medium.

According to another embodiment of the invention, a computer program product for use with an image capturing apparatus including an image capturing unit which captures image data of an object, a display control unit which displays an image on a display unit based on the image data, and a recording control unit which records the image data in a storing medium, the computer program product being stored in a computer usable medium including computer readable program means, the computer program product comprises:

first computer readable program means for generating items of zoom image data having different zoom magnifications from the captured image data;

second computer readable program means for displaying through images based on the items of the generated zoom image data on the display unit;

third computer readable program means for selecting zoom magnifications by selecting some of the through images displayed on the display unit; and fourth computer readable program means for recording image data corresponding to the selected zoom magnifications in the storing medium when an image capture is instructed.

According to another embodiment of the invention, a computer program product for use with an image capturing apparatus including an image capturing unit which captures image data of an object, a display control unit which displays an image on a display unit based on the image data, an optical zoom unit, and an electronic zoom unit, the computer program product being stored in a computer usable medium including computer readable program means, the computer program product comprises:

first computer readable program means for generating items of zoom image data having different zoom magnifications from the captured image data;

second computer readable program means for displaying through images on the display unit based on the items of the generated zoon image data;

third computer readable program means for selecting one of the zoom magnifications by selecting one of the through images displayed on the display unit; and fourth computer readable program means for displaying a through image corresponding to a zoom magnification realized by the optical zoom unit and a through image corresponding to a zoom magnification realized by both the optical zoom unit and the electronic zoom unit in a different manner.

According to another embodiment of the invention, a computer program product for use with an image capturing apparatus including an image capturing unit which captures image data of an object, a display control unit which displays an image on a display unit based on the image data, a magnification setting unit which sets a zoom magnification, and a recording control unit which records image data corresponding to the set zoom magnification to a storing medium when an image capture is instructed, the computer program product comprises:

first computer readable program means for generating first item of image data and second items of image data from the captured image, wherein the first item of image data corresponds to the set zoom magnification, and the second items of image data correspond to different zoom magnifications;

second computer readable program means for displaying a through image based on the first item of the image data on a first area, and displaying a plurality of through images based on the second items of the image data on second areas, wherein a display screen of the display unit being divided into the first area and the second areas which are smaller than the first area;

third computer readable program means for selecting a zoom magnification by selecting one of the through images displayed on the second areas; and fourth computer readable program means for setting the selected zoom magnification to the magnification setting unit.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 6 is a flowchart of direct zoom mode processing of a second embodiment in the digital camera.

DETAILED DESCRIPTION OF THE INVENTION

An embodiment of an image capturing apparatus according to the present invention will now be described with reference to the accompanying drawings.

First Embodiment

Figure 1A:
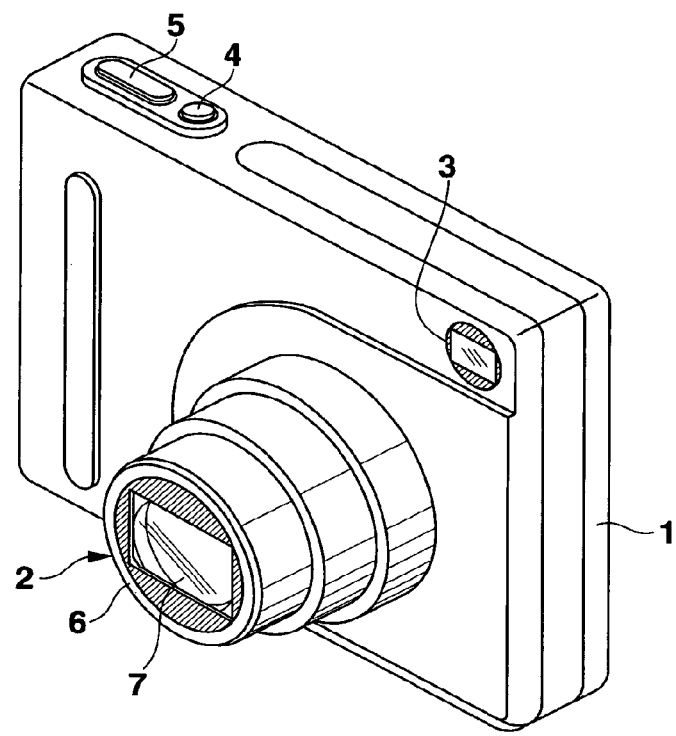
FIG. 1A is a front perspective view of a digital camera viewed from the upper side according to embodiments of the invention.
Figure 1B:
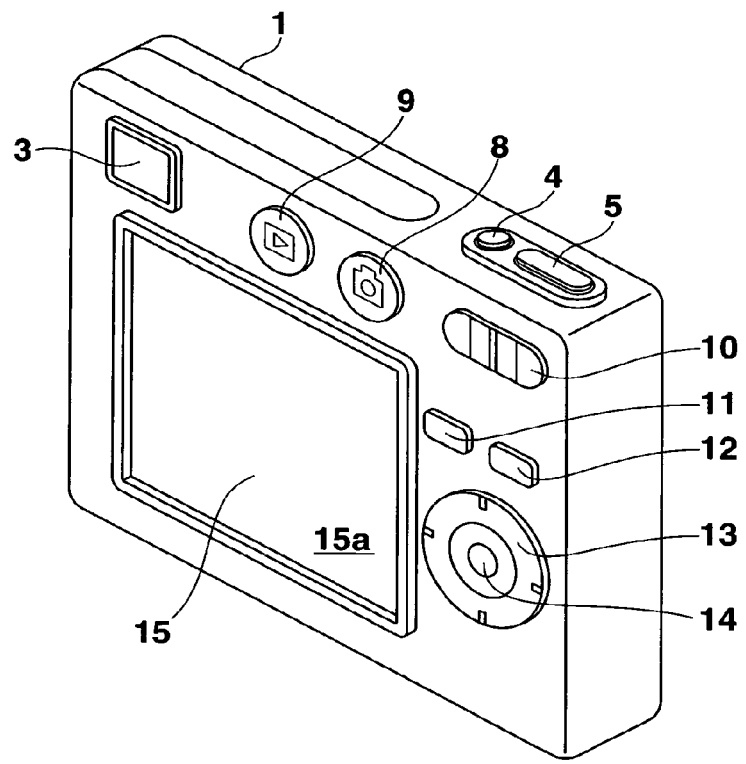
FIG. 1B is a rear perspective view of the digital camera viewed from the upper side.

FIG. 1A is a front perspective view of a digital camera viewed from the upper side thereof according to embodiments of the invention. FIG. 1B is a rear perspective view of the digital camera viewed from the upper side thereof. The digital camera is equipped with a zoom function including both optical zoom and electronic zoom. The maximum magnification is treble "3×" for each of optical zoom and electronic zoom ("9×" when both are used). As shown in FIG. 1A, a lens unit 2 and an optical finder 3 are located on a substantially rectangular front face of a thin camera body 1. A power key 4 and a shutter key 5 are provided on a left side area of a top surface of the camera body 1.

The lens unit 2 is retractable and includes a lens barrel 6 and an image capturing lens system 7. The lens system 7 is provided in the multi-stage telescopic lens barrel 6, and is movable along the optical axis. The lens system 7 includes optical lenses such as a zoom lens and a focus lens. The lens unit 2 protrudes forward as shown in FIG. 1A, when the power is on, or when an operation mode is changed into an image capturing mode from another mode. The lens unit 2 is housed in the camera body 1 when the power is off or when the operation mode is a playback mode.

As shown in FIG. 1B, the optical finder 3, switches, and a liquid crystal display (LCD) 15 are arranged on the rear surface of the camera body 1. The switches include a REC (recording) key 8 for setting a recording mode, a PB (playback) key 9 for setting the playback mode, a zoom key 10, a menu key 11 for displaying a menu screen, a display key 12, a ring-shaped direction key 13, a set key 14 arranged within the ring of the direction key 13.

The direction key 13 and the set key 14 are operated for selecting an item displayed on the menu screen and for image selection described later.

The LCD 15 is formed with a color LCD panel equipped with a back light. The LCD 15, on standby for shooting in the recording mode, displays an image (through image) of an object or a variety of information for shooting. An aspect ratio of a display screen 15a of the LCD 15 is 9:16, and horizontally longer than ordinary display screens having aspect ratio of 3:4. It is possible to display images on a main area A1 in maximum size, and on three sub-areas A2a, A2b, and A2c arranged vertically on the right side area of the main area A1 (see FIG. 5A). The aspect ratio of A1, A2a, A2b, and A2c is the same as the ordinary aspect ratio of 3:4.

A removable external memory 31 (see FIG. 2) such as a memory card is connected to the camera body 1 through a memory card slot provided at the bottom of the camera body 1 (not shown). The external memory 31 is a storing medium for storing the captured image.

Figure 2:
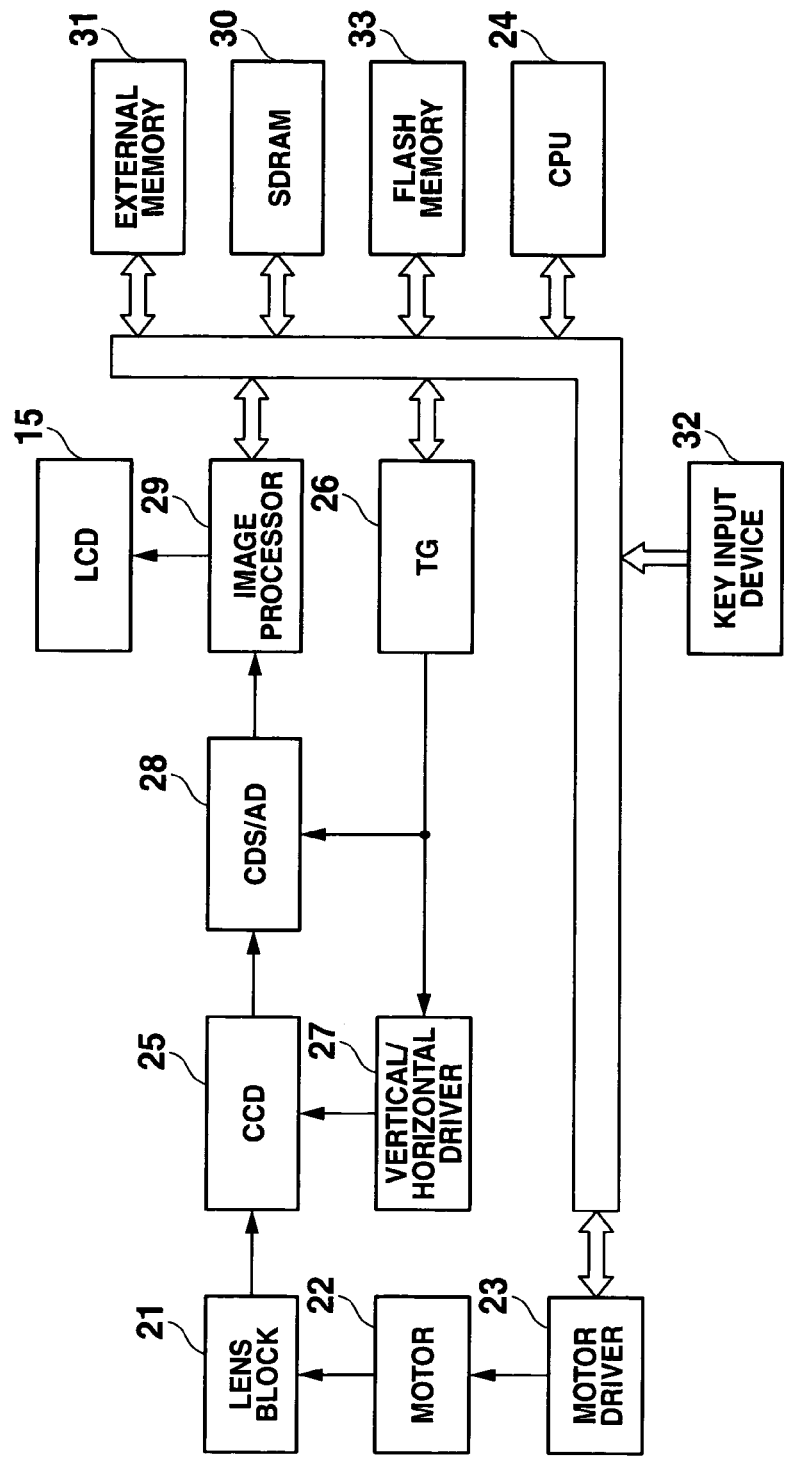
FIG. 2 is a schematic block diagram of the digital camera, showing the electric configuration thereof.

FIG. 2 is a schematic block diagram of the digital camera, showing the electric configuration thereof. A lens block 21 includes the lens barrel 6, the lens system 7 and driving mechanism. The driving mechanism drives the lens barrel 6 and the lens system 7. A motor 22 (including a zoom motor and a focus motor) is provided within the lens barrel 6, and drives the lens barrel 6 and the lens system 7 along the optical axis. A motor driver 23 drives the motor 22 according to the instruction from a CPU 24. The CPU 24 controls the entire digital camera. The lens block 21 and the motor driver 23 perform the optical zoom function.

A charge coupled device (CCD) 25 is an image sensor and arranged perpendicular to the optical axis of the lens system 7 in the lens block 21. Timing generator (TG) 26 generates a timing signal according to the instruction from the CPU 24. The CCD 25 is driven by a vertical and horizontal driver 27 in response to the timing signal and outputs a captured analog image signal corresponding to a captured optical image of the object into a signal processing circuit (CDS/AD) 28. The signal processing circuit 28 includes a correlated double sampling (CDS) circuit which removes the noise contained in the signal output from the CCD 25 by correlated double sampling, and an analog-digital (A/D) converter which converts the captured image signal subjected to the noise removing into a digital signal. The captured image signal converted into the digital signal is output to an image processor 29.

The image processor 29 processes the input captured image signal by operations such as a pedestal clamp operation, converts the signal into a luminance signal (Y) and a color difference signal (UV), and performs digital processing such as auto white balance processing, edge enhancement processing, and pixel interpolation processing, for improving the image quality. The YUV data converted by the image processor 29 are sequentially stored in a synchronous dynamic random access memory (SDRAM) 30. In the recording mode, each time one frame of data (image data) is stored in the SDRAM 30, the data is converted into a video signal, and transferred to the LCD 15 to be displayed as a through image.

In a recording mode, an operation of the shutter key 5 triggers the CCD 25 to capture the image of the object. The captured image data is temporarily stored in the SDRAM 30. The CPU 24 compresses the image data temporarily stored in the SDRAM 30, and finally records the image data in the external memory 31 as a still picture file in a predetermined format. The still picture file recorded in the external memory 31 is read out by the CPU 24 for decompression in response to a selection instruction by the user in the playback mode, and is expanded and stored into the SDRAM 30 as YUV data. Thereafter, the data is displayed on the LCD 15.

The key input device 32 includes the power key 4, the shutter key 5, the REC key 8, the PB key 9 and so on. When any of the keys is operated by the user, the key input device 32 transmits an operation signal corresponding to the content of the operation to the CPU 24.

A flash memory 33 is a non-volatile memory for storing various data and programs for causing the CPU 24 to control the components of the camera. The programs include the programs for controlling AE, AF and AWB processing. In the present embodiment, the flash memory 33 stores the programs for causing the CPU 24 to perform as a display controller, a record controller, an electronic zoom controller and a zoom magnification setting unit in a direct zoom mode described later. The flash memory 33 also stores setting information relating the operation of the digital camera. The setting information is selected and determined by the user.

Figure 3:
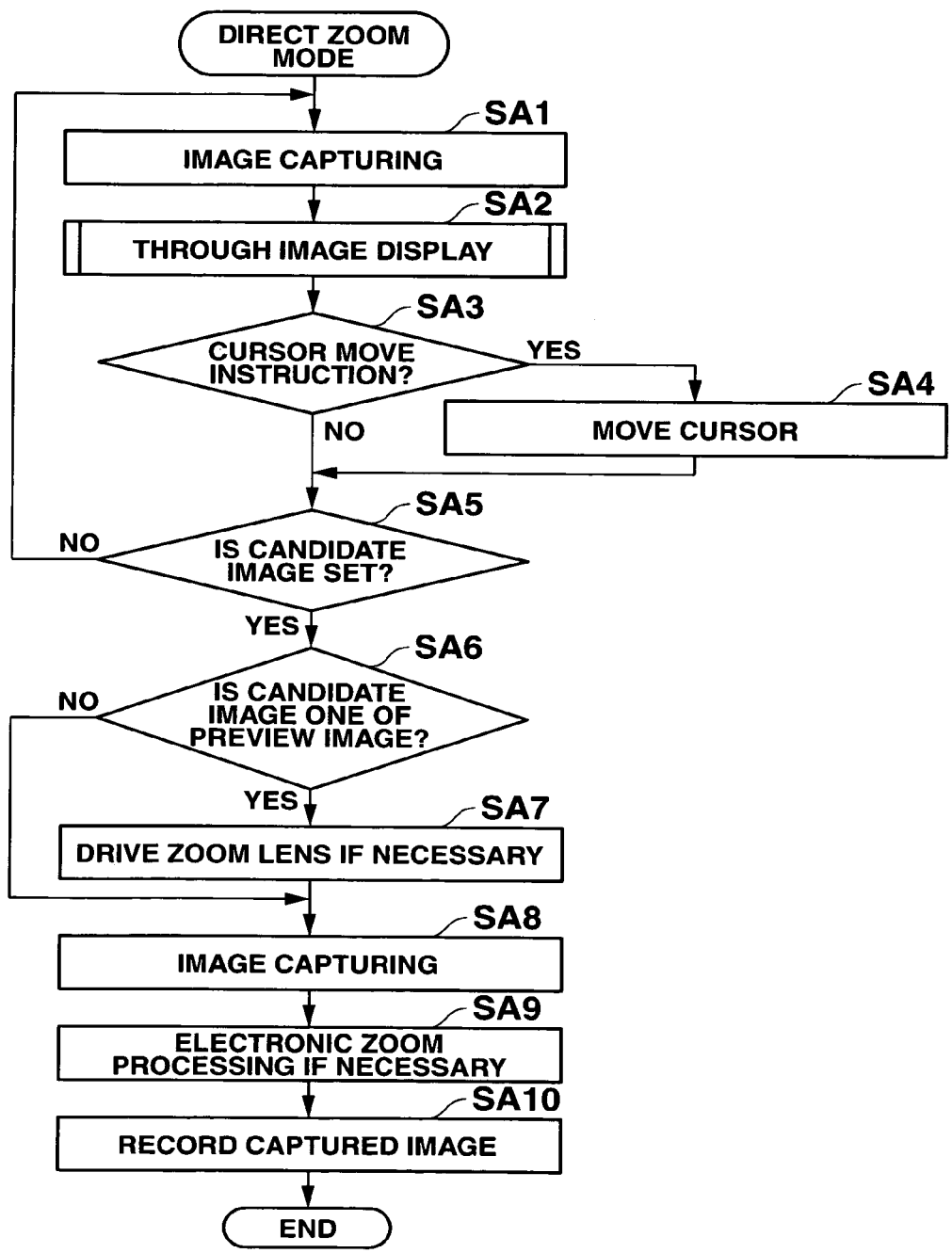
FIG. 3 is a flowchart showing direct zoom mode processing of a first embodiment in the digital camera.

Subsequently, the operation of the digital camera having the above-described configuration will be described hereinafter. FIG. 3 is a flowchart of the direct zoom mode processing. The flowchart indicates the processing of the CPU 24 in the direct zoom mode. The operation of the power key 4 turns the power on, and the operation of the REC key 8 starts the recording (image capturing) mode. Thereafter, the direct zoom mode processing can be selected.

In the direct zoom mode, the CPU 24 drives the CCD 25 at a predetermined through rate to capture an image of an object at predetermined time intervals (step SA1). The CPU 24 executes through image display processing (step SA2). By the through image display processing, the images of the object are output sequentially (periodically) from the image sensor, and immediately displayed on the LCD 15. Therefore, the user can see the condition of the object image before shooting.

Figure 4:
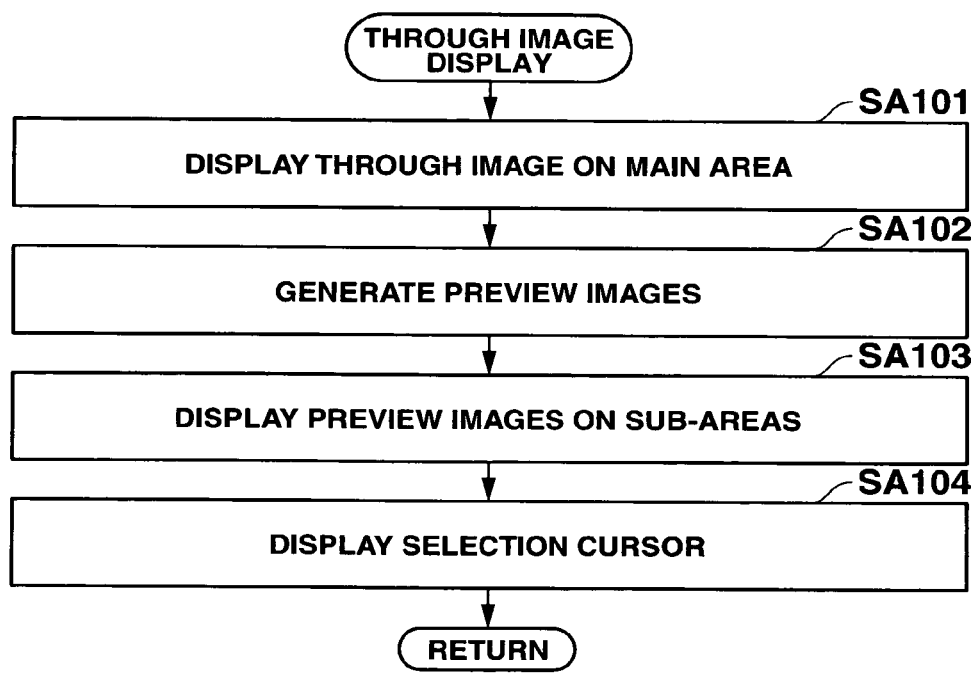
FIG. 4 is a flowchart of through image display processing in the direct zoom mode processing.
Figure 5A:
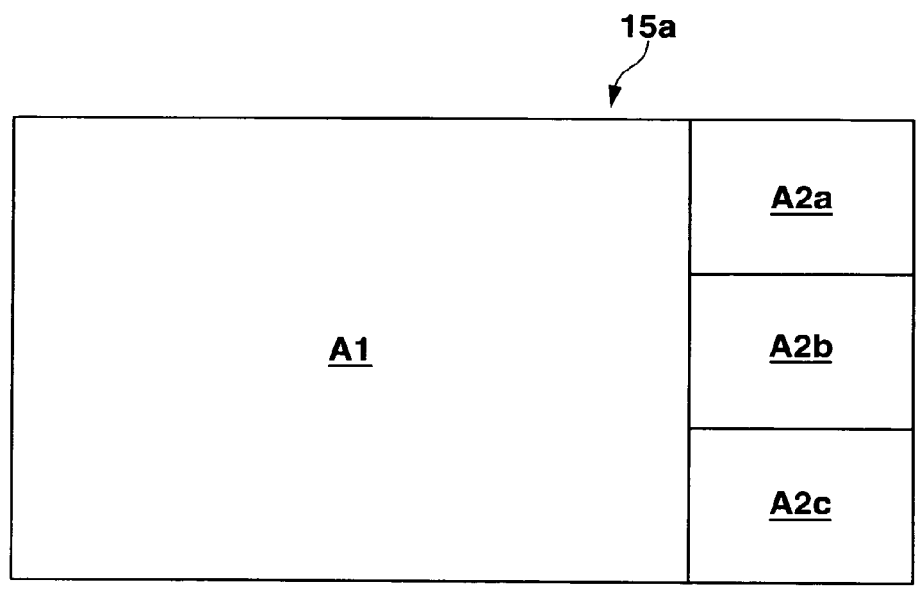
FIG. 5A is a view showing examples of image areas displayed on a display screen of the digital camera in the direct zoom mode.

FIG. 4 is a flowchart of the through image display processing (step SA2). The display screen 15a of the LCD 15 is divided into a main area A1 and three sub-areas A2a, A2b, and A2c as shown in FIG. 5A. Then, a through image 101 is displayed on the main area A1 (step SA101) based on the captured image. When the power key 4 turns the power on, the lens system 7 is set to the wide end so that the zoom magnification is set to one "1×".

Figure 5B:
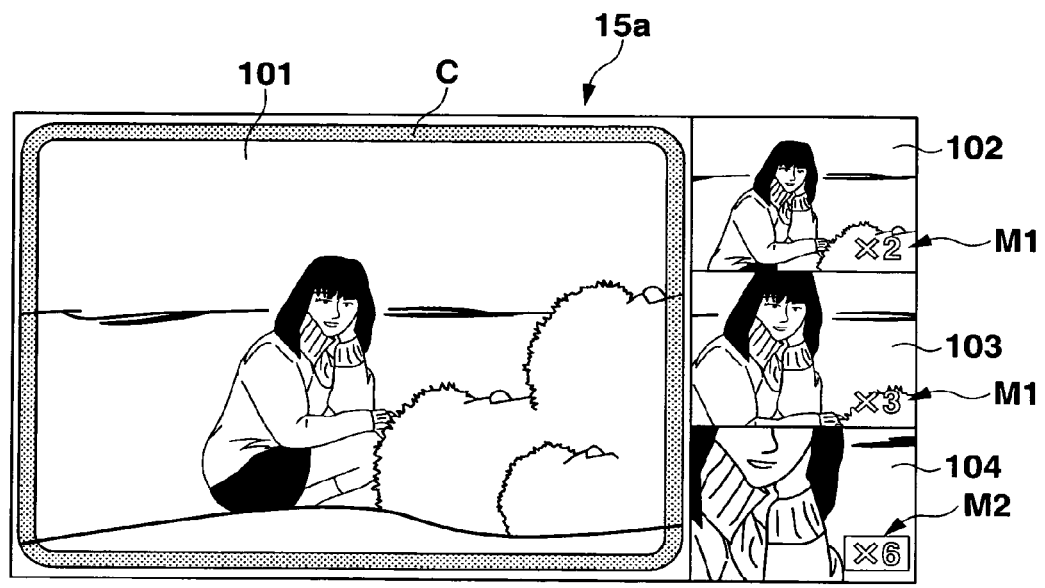
FIG. 5B is a view showing examples of object images displayed on the display screen of the digital camera in the direct zoom mode.

Subsequently, three preview images, respectively corresponding to three predetermined zoom magnifications ("2×", "3×" and "6×" in the present embodiment) are generated from the image captured for the through display (step SA102). Image areas, which respectively correspond to the above-described zoom magnifications, are clipped from the captured image data temporarily stored in the SDRAM 30 (step SA102). The images clipped from the captured image for each zoom magnifications are referred to as the preview images. As shown in FIG. 5B, the "2×" preview image 102, "3×" preview image 103, and "6×" preview image 104 are displayed on the sub-areas A2a, A2b, and A2c of the display screen 15a (step SA103), in ascending order of the zoom magnification. Each of the preview images indicates the image area to be acquired by shooting when the corresponding magnification is selected.

As shown in FIG. 5B, magnification marks M1 and M2 are superposed on the respective preview images 102, 103, and 104 displayed on the sub-areas A2a, A2b, and A2c. The magnification mark M1 is a character string such as "×2", and the magnification mark M2 is a character string surrounded by a frame or the like. When the zoom magnification is double "2×" or treble "3×", i.e., the magnification realized merely by the optical zoom, the magnification mark M1 is displayed. When the zoom magnification is "6×", the magnification mark M2 is displayed in such a manner that the character string "×6" is surrounded by the frame in order to indicate that both optical zoom and electronic zoom are employed.

A frame-shaped selection cursor C is displayed on one of the main or sub-areas (step SA104). The selection cursor C is displayed according to the setting at the time of starting the through image display processing. As shown in FIG. 5B, the selection cursor C is displayed on the main area A1 by default, i.e., immediately after the direct zoom mode is started. Then, the flow returns to the main flow of FIG. 3.

Although it is not shown in the flowchart, when the user operates the zoom key 10 to change the zoom magnification in the case where the above-described processing is being executed, the zoom magnification for capturing the through image 101 is changed, and the image subjected to the magnification change is displayed on the main area A1. When the changed zoom magnification is within the optical zoom range ("1×" through "3×"), the zoom lens (lens system 7) is driven into the predetermined position based on the zoom magnification change, and the image capturing processing of step SA1 is executed. When the zoom magnification is changed into the magnification within the electronic zoom range ("3×" through "9×"), the image capturing processing of the step SA1 is performed in the following way. The zoom lens is driven to the predetermined position (corresponding to the "3×" optical zoom), the image of the object is captured, and the area to be clipped by the electronic zoom is changed based on the zoom magnification change. The change of the zoom magnification through the zoom key 10 changes the angle of view of the through image 101 to be displayed on the main area A1. When the shooting direction of the camera is not changed, only the through image 101 varies according to the zoom magnification change. When the shooting direction is not changed, because the magnifications corresponding to the assumed zoom images 102, 103, and 104 are maintained to be "2×", "3×", and "6×" respectively, the display of the assumed zoom images do not change.

When the changed zoom magnification is less than or equal to "2×", the "2×" preview image 102, "3×" preview image 103, and "6×" preview image 104 can be created from the image captured for the through display (the through image 101). When the zoom magnification is more than or equal to "3×", the image capturing is performed with the "3×" optical zoom. The captured image indicates an angle of view corresponding to the "3×" optical zoom. The angle of view corresponding to the "2×" zoom is wider than the angle of view corresponding to the "3×" optical zoom. Accordingly, the "2×" preview image can not be acquired from the captured "3×" optical zoom image. Therefore, the "2×" preview image is generated as follows. When the zoom lens is located in the wide end position (the position for the "1×" zoom in the present embodiment), e.g., immediately after the recording mode and the direct zoom mode are sequentially started, or when the zoom lens is located in the wide end position by the operation of the user, the image data of the captured image is acquired and temporarily and separately stored in the SDRAM 30 as reference image data. When the lens system 7 is set to the position corresponding to the "×" optical zoom, at the step SA102 in the through image display processing, the basic image data is used in order to generate the preview images 102 and 103 (corresponding to the "1×" and "2×" optical zooms). The zoom magnifications corresponding to the preview images 102 and 103 are less than "3×". When the zoom key 10 is operated to change the zoom magnification within the electronic zoom range ("3×" through "9×"), the image is captured with the "3×" optical zoom, and the corresponding electronic zoom processing is performed. The through image 101 (within the electronic zoom range) is generated from the captured image ("3×" image) by the electronic zoom processing, and displayed on the main area A1. Thereby, the "3×" and "6×" preview images may be obtained from the captured image (corresponding to the "3×" optical zoom).

In FIG. 3, when it is instructed to move the selection cursor C by the direction key 13 ("YES" at step SA3), the CPU 24 moves the selection cursor C to another area on the display screen 15a according to the instruction (step SA4). The CPU 24 determines whether or not the set key 14 is operated (step SA5). The image set by the set key 14 is referred to as a candidate image. When it is not instructed to move the selection cursor C ("NO" at step SA3), the CPU 24 immediately determines whether or not the candidate image is set (step SA5). When the candidate image is not set ("No" at step SA5), the flow returns to step SA1 and repeats the above-described steps. When the candidate image is set ("YES" at step SA5), the CPU 24 determines whether or not the selected candidate image is one of the preview images 102, 103, and 104 (step SA6).

When the through image 101 displayed on the main area A1 is selected as the candidate image ("NO" at step SA6), shooting for recording is immediately performed (step SA8) by skipping step SA7. The electronic zoom processing is executed onto the image data temporarily stored in the SDRAM 30 if necessary, based on the electronic zoom magnification set to the selected through image 101 (step SA9). When the set zoom magnification for the through image 101 displayed on the main area A1 is more than "3×", the electronic zoom processing is executed. Thereafter, the captured image data temporarily stored in the SDRAM 30, or the image data subjected to the electronic zoom processing is compressed and stored in the external memory 31. That is, the image data having the same angle of view as the displayed through image 101 is stored in the external memory 31 (step SA10).

When the candidate image is one of the preview images 102, 103, and 104 ("YES" at step SA6), the zoom lens (lens system 7) is driven to the position corresponding to the optical zoom magnification for capturing the candidate image if necessary (step SA7). For example, in the case where the through image 101 is captured with the "2×" optical zoom and displayed, when the "3×" preview image 103 or "6×" preview image 104 is selected, the zoom lens is automatically driven to the position corresponding to the "3×" optical zoom. In the case where the through image 101 is captured with the "2×" optical zoom, when the "2×" preview image 102 is selected, the lens position is maintained. Thereafter, shooting for recording is performed (step SA8). When the magnification corresponding to the candidate image is "6×", the "2×" electronic zoom processing is executed onto the "3×" captured image data (step SA9). Subsequently, the image data captured as is, or the image data subjected to the electronic zoom processing is compressed and stored in the external memory 31. That is, the image data having the same angle of view as the candidate image (selected from the preview images 102, 103, and 104) is stored in the external memory 31 (step SA10). Thereby, a single shooting operation in the direct zoom mode is completed.

Therefore, in the direct zoom mode, a plurality of preview images are displayed according to a plurality of zoom magnifications on the display screen 15a. It is not necessary for the user to set each of the zoom magnifications. It is merely required that the user to select a desired image (move and set the position of the selection cursor C) from the preview images 102, 103, and 104 displayed on the same display screen. The zoom magnification (the angle of view) is instantaneously changed into the desired magnification and shooting is executed. Thus, shooting at sufficiently high speed is realized.

On the sub-areas A2a, A2b, and A2c, the magnification marks M1 and M2 are displayed together with the preview images 102, 103, and 104. When selecting the preview image (zoom magnification), the user can reliably see the zoom magnifications of the preview images.

The magnification mark M2 which represents the "6×" zoom is the character string surrounded by the frame and clearly indicates that both optical and electronic zooms are employed. Thereby, the user can select the preview image (zoom magnification) considering the image quality.

In the present embodiment, the magnification marks M1 and M2 are displayed in different manners from each other. The zoom magnification realized merely by the optical zoom and the zoom magnification realized by both optical and electronic zoom can be distinguished from each other with the magnification marks M1 and M2. The distinction may be performed by the different way such as displaying a line between the sub-areas A2b and A2c.

The zoom magnifications corresponding to the preview images 102, 103, and 104, are "2×", "3×", and "6×", in the present embodiment. However, another combination of the zoom magnifications may alternatively be employed. The zoom magnifications are required to be different from each other. Moreover, the zoom magnifications may be changed by the operation of the user.

The display screen 15a is divided into a main area A1 and smaller sub-areas A2a, A2b, and A2c in the present embodiment. The through image 101 is displayed on the main area A1, and the preview images 102, 103, and 104 are displayed respectively on the sub-areas A2a, A2b, and A2c. However, all the areas may have the same size. Regardless of the size of the areas, the number of the preview images (number of the sub-areas) to be simultaneously displayed can be changed.

In the present embodiment, in order to select the through image 101, the same selection operation as selecting the sub-areas A2a, A2b, or A2c, is executed, i.e., the movement and the setting of the selection cursor C by the direction key 13 and the set key 14. However, for shooting (selecting) the through image 101 on the main area A1, a shooting instruction by the shutter key 5 may trigger the shooting, without the setting of the candidate image.

The selectable areas (images) may be limited to the sub-areas (preview images). When shooting is instructed through the shutter key 5 in the case where one of the sub-areas is selected, the captured image is recorded with the above-described processing after step SA6. When shooting is instructed by the shutter key 5 in the case where none of the sub-areas is selected, the captured image is recorded with the above-described processing after step SA8.

In the present embodiment, the digital camera includes both optical and electronic zoom function is described. However, the present invention is applicable to a digital camera having only one of the optical and electronic zoom functions.

Other embodiments of the image capturing apparatus according to the present invention will be described. The same portions as those of the first embodiment will be indicated in the same reference numerals and their detailed description will be omitted.

Second Embodiment

The second embodiment of the present invention will be described hereinafter. FIG. 6 is a flowchart of the direct zoom mode processing in the present embodiment executed by the CPU 24 of the digital camera having the configuration shown in FIGS. 1A, 1B and 2. The operation of the power key 4 turns the power on, and the operation of the REC key 8 starts the recording (image capturing) mode. Thereafter, the direct zoom mode processing can be selected.

In the direct zoom mode, the CPU 24 drives the CCD 25 at the predetermined through rate to capture the images of the object at the predetermined time intervals (step SB1) and executes the through image display processing (step SB2). The through image display processing is the same as the processing shown in FIG. 4 in the first embodiment. With the through image display processing, the images of the object including the through image 101 and the preview images 102, 103, and 104 are displayed on the display screen 15a as shown in FIG. 5B. Magnification marks M1 and M2 are also displayed on the sub-areas A2a, A2b and A2c. The selection cursor C is displayed on the predetermined sub-area (sub-area A2a by default). In the present embodiment, the selectable areas are different from the first embodiment. The selection cursor C moves only among the sub-areas A2a, A2b, and A2c.

Subsequently, when it is instructed to move the selection cursor C by the direction key 13 ("YES" at step SB3), the CPU 24 moves the selection cursor C to another sub-area on the display screen 15a according to the instruction (step SB4).

The CPU 24 determines whether or not the set key 14 is operated (step SB5). The image set by the set key 14 operation is referred to as the candidate image. When it is not instructed to move the selection cursor C ("NO" at step SB3), the CPU 24 immediately determines whether or not the candidate image is set (step SB5).

When it is determined that the candidate image is set ("YES" at step SB5), the zoom processing is executed based on the magnification corresponding to the set candidate image (step SB6). That is, the zoom magnification for capturing the through image 101 is replaced by the zoom magnification corresponding to the candidate zoom image. When the optical zoom magnification for capturing the through image 101 is different from the optical zoom magnification of the candidate image, the zoom lens (lens system 7) is driven into the zoom position corresponding to the optical zoom magnification of the candidate image. When the electronic zoom magnification of the through image 101 differs from the electronic zoom magnification of the candidate image, the area to be clipped for generating the through image 101 is changed. Thereafter, the flow returns to step SB1. As a result of the processing of steps SB1 and SB2, the through image 101 having the same angle of view as the candidate image is newly displayed on the main area A1. The candidate image is enlarged and displayed as the through image 101. That is, the zoom magnification change is applied in such a way that the user selects the candidate image from the preview images displayed on the sub-areas, and the main area A1 immediately displays the image corresponding to the zoom magnification of the candidate image.

Accordingly, the user can select the zoom magnification comparing the displayed images of the different zoom magnifications (angles of view). Even when it is immediately after the zoom magnification change, the through image subjected to the zoom magnification change is newly displayed on the main area, thereby the change is immediately applied for the display. The user can compare the through image 101, whose zoom magnification is changed, with the preview images having different zoom magnifications. Moreover the user can confirm the selected zoom magnification.

When it is determined that the setting of the candidate image is not performed ("NO" at step SB5), the CPU 24 determines whether or not the user operates the zoom key 10 to change the zoom magnification. When it is instructed to change the zoom magnification ("YES" at step SB7), the zoom processing based on the zoom magnification change is performed (step SB8). According to the zoom magnification change, the main area A1 sequentially displays the through image subjected to the zoom magnification change. Thereby, the zoom magnification of the through image 101 may be manually adjusted.

Thereafter, when the zoom magnification change is not instructed ("NO" at step SB7), it is determined whether or not the shutter key 5 is depressed (step SB9). In the case where the shutter key 5 is not depressed ("NO" at step SB9), the flow returns to step SB1 and repeats the above-described processing.

Although it is not shown in the flowchart, the image is captured when the zoom lens is located in the wide end position, and separately stored as reference image data, also in the present embodiment. At step SA102 in the through image display processing of FIG. 4, the preview image, whose optical zoom magnification is less than the optical zoom magnification of the zoom lens, is generated from the reference image data.

When the shutter key 5 (shooting instruction unit) is operated ("YES" at step SB9), shooting for recording is performed, in the same way as the ordinary recording mode (step SB10). When the zoom magnification for capturing the through image 101 is more than 3× (within the electronic zoom range), both optical and electronic zooms are required. The image data is captured with the 3× optical zoom and temporarily stored in the SDRAM 30. The image data is processed with the electronic zoom processing based on the zoom magnification for capturing the through image 101 if necessary (step SB11). The image data captured as is, or the image data subjected to the electronic zoom processing is compressed and stored in the external memory 31 (step SB12). Thereby, a single shooting operation in the direct zoom mode is completed.

The combination of the zoom magnifications for the preview images 102, 103, and 104 may be changed also in the present embodiment. The user may change the zoom magnifications according to the need.

All the display areas, including the main area A1 and the sub-areas A2a, A2b, and A2c, may have the same size. The number of the preview images (number of the sub-areas) to be simultaneously displayed with the through image 101 may be changed.

In the present embodiment, the magnification marks M1 and M2 are displayed on the sub-areas. The user can reliably see the zoom magnifications of the preview images 102, 103, and 104 for selecting the candidate image (the zoom magnification). Moreover, the user can select the zoom magnification considering the image quality. However, the magnification marks M1 and M2 may not be displayed.

The magnification marks may be displayed in the same way as the first embodiment so that the zoom magnification realized merely by the optical zoom and the zoom magnification realized by both optical and electronic zooms can be distinguished.

In the present embodiment, the digital camera includes both optical and electronic zoom function is described. However, the present invention is applicable to a digital camera having only one of the optical and electronic zoom functions.

Third Embodiment

Figure 7:
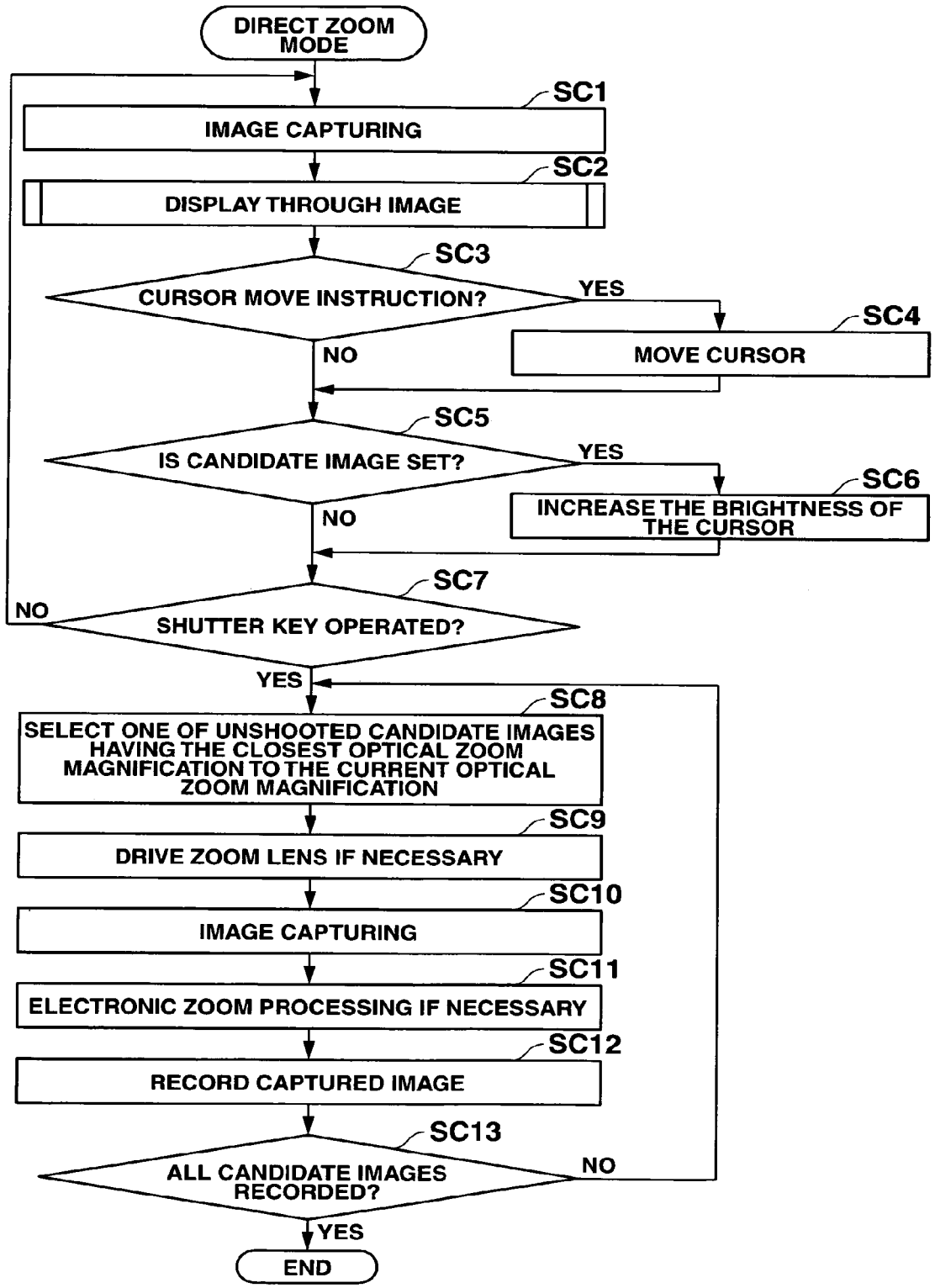
FIG. 7 is a flowchart of direct zoom mode processing of a third embodiment in the digital camera.

The third embodiment of the present invention will be described hereinafter. FIG. 7 is a flowchart of the direct zoom mode processing in the present embodiment executed by the CPU 24 of the digital camera having the configuration shown in FIGS. 1A, 1B and 2. The operation of the power key 4 turns the power on, and the operation of the REC key 8 starts the recording (image capturing) mode. Thereafter, the direct zoom mode processing can be selected.

In the direct zoom mode, the CPU 24 drives the CCD 25 at the predetermined through rate to capture the images of the object at the predetermined time intervals (step SC1) and executes the through image display processing (step SC2). The through image display processing is the same as the processing shown in FIG. 4 in the first embodiment. By the through image display processing, the images of the object including the through image 101 and the preview images 102, 103, and 104 are displayed on the display screen 15a as shown in FIG. 5B. Magnification marks M1 and M2 are also displayed on the sub-areas A2a, A2b and A2c. The selection cursor C is displayed on the predetermined sub-area (main area A1 by default).

Subsequently, when it is instructed to move the selection cursor C by the direction key 13 ("YES" at step SC3), the CPU 24 moves the selection cursor C to another area on the display screen 15a according to the instruction (step SC4).

The CPU 24 determines whether or not the set key 14 is operated (step SC5). The image set by the set key 14 operation is referred to as the candidate image. When it is not instructed to move the selection cursor C ("NO" at step SC3), the CPU 24 immediately determines whether or not the candidate image is set (step SC5). The above-described processing is the same as the corresponding processing of the first and second embodiments.

Thereafter, in the present embodiment, when it is determined that the candidate image is not set ("NO" at step SC5), the flow immediately goes to step SC7. When it is determined that the candidate image is set ("YES" at step SC5), the brightness of the selection cursor C displayed is increased to show settlement of the candidate, for example (step SC6). The selection cursor C is fixed on the candidate image in the subsequent steps.

Thereafter, it is determined whether or not the shutter key 5 is depressed (step SC7). When it is determined that the shutter key 5 is not depressed ("NO" at step SC7), the flow returns to step SC1 and repeats the above-described processing. In the case where the above-described processing is being repeated, when the movement and setting of the selection cursor C are newly performed, the selection cursor C newly displayed and settled on the selected candidate image (including the through image 101). Therefore, two or more selection cursors are displayed on the candidate images.

Although it is not shown in the flowchart, the image data is captured when the zoom lens is located in the wide end position, and separately stored as reference image data, also in the present embodiment. At step SA102 in the through image display processing of FIG. 4, the preview image, whose optical zoom magnification is less than the optical zoom magnification of the zoom lens, is generated from the basic image data. When the user operates the zoom key 10 to change the zoom magnification, the zoom magnification for capturing the through image 101 is sequentially changed.

When the shutter key 5 is depressed ("YES" at step SC7), the zoom magnification for shooting is defined to make minimum an amount of optical zoom magnification changing in the following way. From among the candidate images, one candidate image is selected. The selection is for selecting one of unshooted candidate images having the closest optical zoom magnification to the current setting of the lens unit 7 (the current optical zoom magnification for capturing the through image 101). The zoom magnification for shooting is defined as the zoom magnification corresponding to the selected candidate image (step SC8). When the optical zoom magnification for shooting is different from the current setting of the lens system 7, the zoom lens (lens system 7) is driven to the zoom position corresponding to the optical zoom magnification for shooting if necessary (step SC9). Thereafter, shooting for recording is executed (step SC10). When the zoom magnification for shooting is more than 3× (within the electronic zoom range), shooting is executed with the 3× optical zoom, and the captured image (3× optical zoom) requires to be processed by the electronic zoom processing. The image data captured with the 3× optical zoom (temporarily stored in the SDRAM 30) is processed with the electronic zoom processing based on the zoom magnification for shooting if necessary (step SC11). The image captured as is or the image data subjected to the electronic zoom processing is compressed and recorded in the external memory 31 (step SC12).

It is determined whether or not shooting of all the candidate images are completed (step SC13). When it is determined shooting of all the candidate images is not completed ("NO" at step SC13), the selection of the candidate image is newly performed. That is, from among the remaining candidate images, the candidate image, whose optical zoom magnification is next closest to the setting of the lens unit 7, is newly selected at step SC8. The above-described steps SC8 through SC13 are repeated until shooting of all the candidate images is completed. Therefore, the zoom magnification for shooting automatically changes to the magnification corresponding to the selected candidate image, and shooting is performed successively with different zoom magnifications. When shooting of every candidate images for every selected zoom magnifications (it can be a single zoom magnification) is completed ("YES" at step SC13), a single shooting operation in the direct zoom mode is completed.

The combination of the zoom magnifications of the preview images 102, 103, and 104 may be changed also in the present embodiment. The user may change the zoom magnifications according to the need.

All the display areas, including the main area A1 and the sub-areas A2a, A2b, and A2c, may have the same size. The number of preview images (number of the sub-areas) to be simultaneously displayed with the through image 101 may be changed.

In the present embodiment, the magnification marks M1 and M2 are displayed on the sub-areas. The user can reliably see the zoom magnifications of the preview images 102, 103, and 104 when selecting the candidate image (the zoom magnification). The magnification marks M1 and M2 are displayed on the sub-areas in different manners from each other. The user can select the zoom magnification considering the image quality. The zoom magnification realized merely by the optical zoom and the zoom magnification realized by both optical and electronic zoom can be distinguished from each other with the magnification marks M1 and M2. The distinction may be performed by the different way such as displaying a line between the sub-areas A2b and A2c.

In the present embodiment, it is assumed that at least one candidate image is selected from the through image 101 and the preview images 102 through 104 before the shutter key 5 is depressed. However, it may be occur that the shutter key 5 is depressed in the case where no candidate image is selected. In such a case, the following processing can be applied. When the shutter key 5 is operated, it is determined whether or not any of the candidate images is set. In the case where at least one candidate image is set, the above-described processing after step SC8 is performed as is. In the case where none of the candidate images is set, the message is displayed for prompting user to select a candidate image. Thereafter, the flow may return to step SC1.

Alternatively, the following processing is applicable. The selection cursor C moves only among the sub-areas A2a, A2b, and A2c. That is, the selectable images are limited to the preview images 102, 103, and 104. When the shutter key 5 is operated, it is determined whether or not any of the preview images is selected and set. When at least one preview image is selected and set, the above-described processing after step SC8 is executed as is. In the case where none of the preview images is selected and set, the ordinary shooting operation is executed with the setting of the zoom magnification at the time of the shutter key 5 depression.

In the present embodiment, shooting processing is performed for every candidate image. However, for shooting the candidate images corresponding to the same optical zoom magnification, a single shooting is sufficient. For example, in the case where the "3×" and "6×" preview images are selected and set as the candidate images, the zoom lens is driven to the position corresponding to the "3×" optical zoom, and the shooting processing is executed once. The image (6×) is generated from the "3×" captured image data by the "2×" electronic zoom processing. Thereby, the "3×" image data captured as is, and the image data subjected to the "6×" zoom processing are recorded respectively.

In the present embodiment, the described digital camera includes both optical and electronic zoom function. However, the present invention is applicable to a digital camera having only one of the optical and electronic zoom functions. When the present invention is applied to a digital camera having only the optical zoom function, the shooting processing is executed for every zoom magnification of the candidate images. The zoom magnification for shooting varies for each time the shooting processing is executed. When the present invention is applied to a digital camera having only the electronic zoom function, the single shooting processing is sufficient regardless of the number of the candidate images. The electronic zoom processing is executed for every zoom magnification of the candidate images to the image data captured by the single shooting.

In the above-described embodiments, the aspect ratio of the display screen 15a is 9:16, and horizontally longer than ordinary aspect ratio of 3:4. However, the aspect ratio of the display screen 15a is not limited to the horizontally longer aspect ratio. The display screen having ordinary aspect ratio may be applied to the present invention.

In the above-described embodiments, the preview images 102, 103, and 104 are displayed on the display screen 15a only when the direct zoom mode is executed. However, the preview images may be always displayed in the recording mode, regardless of the setting of the direct zoom mode.

In the above-described embodiments, the present invention is applied to the digital camera. However the application of the present invention is not limited to the digital camera. The present invention is easily applicable to personal digital assistants (PDA), a personal computer having a camera function, or the like.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image capturing apparatus comprising:
   an image capturing unit which captures image data of an object;
   a magnification setting unit which sets a zoom magnification;
   a zoom image data generating unit which generates first item of image data and second items of image data from the captured image, wherein the first item of image data corresponds to the set zoom magnification, and the second items of image data correspond to different zoom magnifications;
   a display control unit displays on a display unit a through image based on the first item of the image data on a first area, and displays a plurality of through images based on the second items of the image data on second areas, wherein a display screen of the display unit being divided into the first area and the second areas which are smaller than the first area;

an instruction unit which instructs to execute image capturing;

a recording control unit which records image data corresponding to the set zoom magnification to a storing medium when the instruction unit instructs to execute image capturing; and a selection unit which selects a zoom magnification by selecting one of the through images displayed on the second areas, wherein the magnification setting unit sets the zoom magnification selected by the selection unit.

2. The image capturing apparatus according to claim 1, wherein an aspect ratio of the display screen of the display unit is different from an aspect ratio of the image data captured by the image capturing unit, and an aspect ratio of the first area and an aspect ratio of the second areas are same as the aspect ratio of the image data.

3. The image capturing apparatus according to claim 1, wherein the display control unit superposes a mark on the through images displayed on the second areas, indicating the zoom magnification corresponding to the second items of the image data.

4. An image capturing method for an image capturing apparatus including an image capturing unit which captures image data of an object, a display control unit which displays an image on a display unit based on the image data, a magnification setting unit which sets a zoom magnification, and a recording control unit which records image data corresponding to the set zoom magnification in a storing medium when an image capture is instructed, the method comprising:

generating first item of image data and second items of image data from the captured image, wherein the first item of image data corresponds to the set zoom magnification, and the second items of image data correspond to different zoom magnifications;

displaying a through image based on the first item of the image data on a first area, and displaying a plurality of through images based on the second items of the image data on second areas, wherein a display screen of the display unit being divided into the first area and the second areas which are smaller than the first area;

selecting a zoom magnification by selecting one of the through images displayed on the second areas; and setting the selected zoom magnification to the magnification setting unit.

* * * * *

UNITED STATES PATENT AND TRADEMARK OFFICE
CERTIFICATE OF CORRECTION

| | |
|---|---|
| PATENT NO. | : 8,917,335 B2 |
| APPLICATION NO. | : 13/405622 |
| DATED | : December 23, 2014 |
| INVENTOR(S) | : Kazunori Yanagi |

Page 1 of 1

It is certified that error appears in the above-identified patent and that said Letters Patent is hereby corrected as shown below:

In The Specification

Column 1, Line 9:

delete "8,154,616" and insert --8,154,646--.

Signed and Sealed this
Thirtieth Day of June, 2015

Michelle K. Lee
*Director of the United States Patent and Trademark Office*